United States Patent
Justice

(10) Patent No.: US 11,453,265 B1
(45) Date of Patent: Sep. 27, 2022

(54) SYSTEM FOR AN ATTACHMENT TO EXISTING A/C UNITS IN VEHICLES

(71) Applicant: Jeff Justice, St Cloud, FL (US)

(72) Inventor: Jeff Justice, St Cloud, FL (US)

(*) Notice: Subject to any disclaimer, the term of this patent is extended or adjusted under 35 U.S.C. 154(b) by 351 days.

(21) Appl. No.: 16/710,134

(22) Filed: Dec. 11, 2019

(51) Int. Cl.
*B60H 1/00* (2006.01)
*F25B 49/02* (2006.01)
*H02K 5/22* (2006.01)
*H02P 27/04* (2016.01)

(52) U.S. Cl.
CPC ..... *B60H 1/00528* (2013.01); *B60H 1/00535* (2013.01); *F25B 49/02* (2013.01); *H02K 5/225* (2013.01); *H02P 27/04* (2013.01)

(58) Field of Classification Search
CPC . B60H 1/00528; B60H 1/00535; F25B 49/02; H02K 5/225; H02P 27/04
See application file for complete search history.

(56) References Cited

U.S. PATENT DOCUMENTS

| 20,280 A | 5/1858 | Lee | |
| 5,226,294 A * | 7/1993 | Mayer | B60H 1/3226 62/323.3 |
| 2003/0082061 A1 * | 5/2003 | Funakoshi | B60H 1/3225 417/410.5 |
| 2005/0268632 A1 * | 12/2005 | Yonekura | B60H 1/00421 62/323.3 |
| 2014/0230470 A1 * | 8/2014 | Cook | B60H 1/3222 62/118 |
| 2020/0041174 A1 * | 2/2020 | Wakabayashi | F25B 1/00 |

\* cited by examiner

*Primary Examiner* — Henry T Crenshaw
(74) *Attorney, Agent, or Firm* — Sanchelima & Associates, P.A.; Christian Sanchelima; Jesus Sanchelima

(57) ABSTRACT

A system for an attachment to existing A/C units in vehicles including a compressor assembly and a battery assembly is disclosed herein. The compressor assembly includes a hermetically sealed compressor that can be engaged without the need of the engine of a vehicle. The hermetically sealed compressor is powered by a battery of the battery assembly. The hermetically sealed compressor is mounted as an attachment or replacement to the existing A/C compressor of a vehicle. Furthermore, the hermetically sealed compressor is mounted using tee connectors and tubes. Additionally, check valves are added to allow the refrigerant within the additional tubes to flow in one direction. This system allows a user to engage the A/C unit of a car without needing the engine to be running.

11 Claims, 4 Drawing Sheets

SYSTEM FOR AN ATTACHMENT TO EXISTING A/C UNITS IN VEHICLES

BACKGROUND OF THE INVENTION

1. Field of the Invention

The present invention relates to A/C units in vehicles and, more particularly, to a system for an attachment to existing A/C units in vehicles that allows a user to utilize the A/C system inside a car without having the engine of the car running.

2. Description of the Related Art

Several designs for a system for an attachment to existing A/C units in vehicles have been designed in the past. None of them, however, include an auxiliary cooling system for a vehicle. The system includes tee connectors that is attached to an existing vehicle compressor line. The system also includes a hermetically sealed electric compressor to allow a user to engage the compressor without the need of having an engine running. It is known that almost all vehicles include an A/C unit that is configured to be engaged when the engine of the vehicle is running. It is also known that this configuration often requires a user to use a substantial amount of fuel to keep the A/C unit of the car running Therefore, there is a need for an A/C unit system that does not rely on the engine of a vehicle to be engaged.

Applicant believes that a related reference corresponds to U.S. patent (published application) No. 20090020280 for A vehicle heating system, and method, for heating a passenger compartment. The heating system has a heat control switch operable to activate the heating system, a fat producing airflow, a ventilation system directing the airflow throughout the passenger compartment and a heater core having a temperature sensor. The heater core is disposed behind the fan, such that air passes through, and is heated by the heater core prior to entering the fan. However, it differs from the present invention because the 20090020280 reference fails to provide an A/C system that does not rely on the engine of a car. Furthermore, the reference only describes a heating system and fails to provide a method to cool the passengers in a vehicle. The present invention addresses these issues by providing an A/C attachment system for a vehicle that allows a user to cool a car without the need of having the engine of a vehicle running.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a system for an attachment to existing A/C units in vehicles that allows a user to utilize the A/C unit in a car without having the engine of the car running.

It is another object of this invention to provide a system for an attachment to existing A/C units that allows a user to switch between the newly attached A/C unit and the existing A/C unit in a vehicle.

It is still another object of the present invention to provide a system for an attachment to existing A/C units that allows a user to save on gasoline consumed by the engine of a car.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
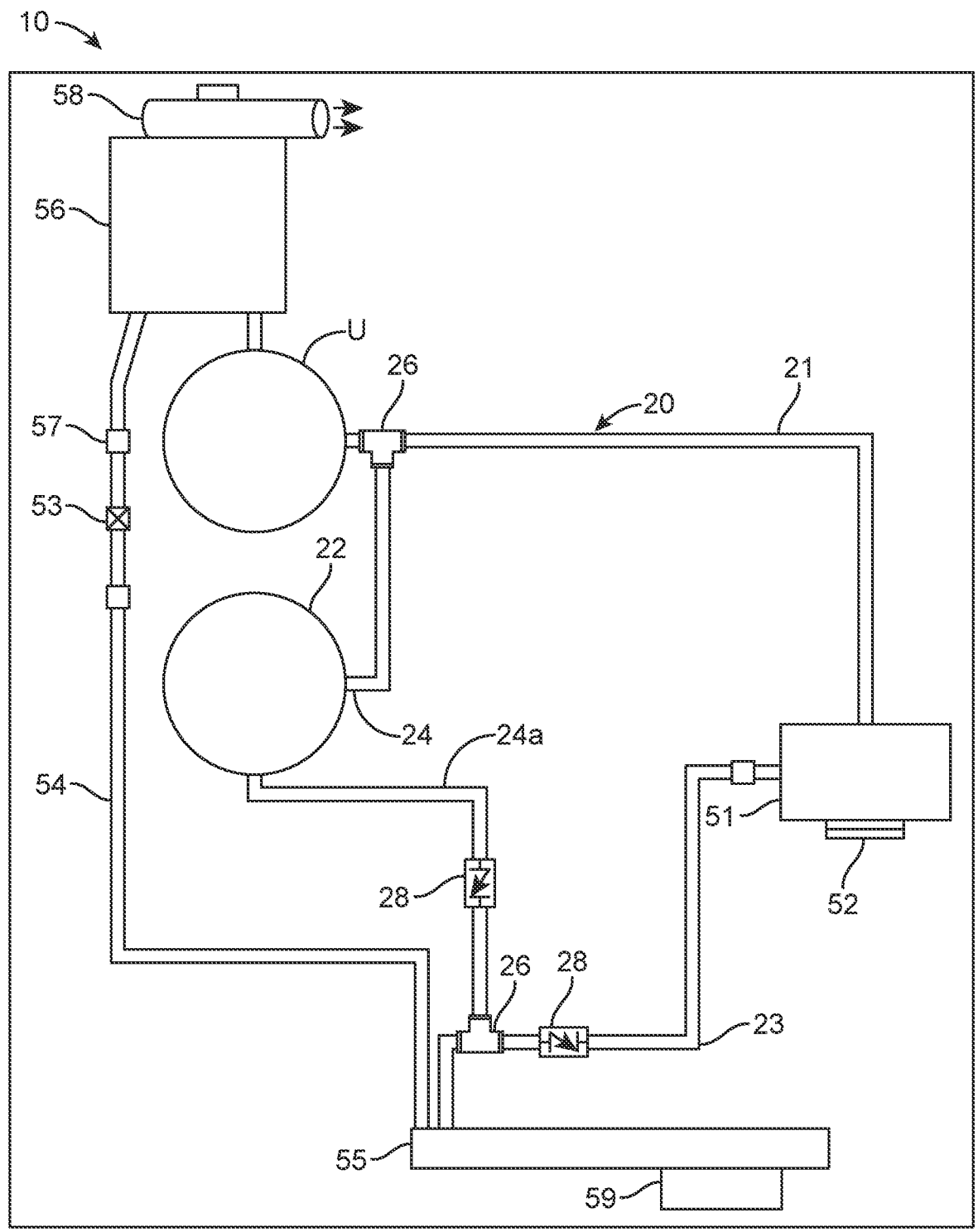
FIG. 1 represents a diagram of A/C system 10. A/C system 10 includes a compressor assembly 20 and a battery assembly 40 not shown in FIG. 1. The compressor assembly 20 is attached to an existing A/C unit in a vehicle comprised for element 51-59.
Figure 2:
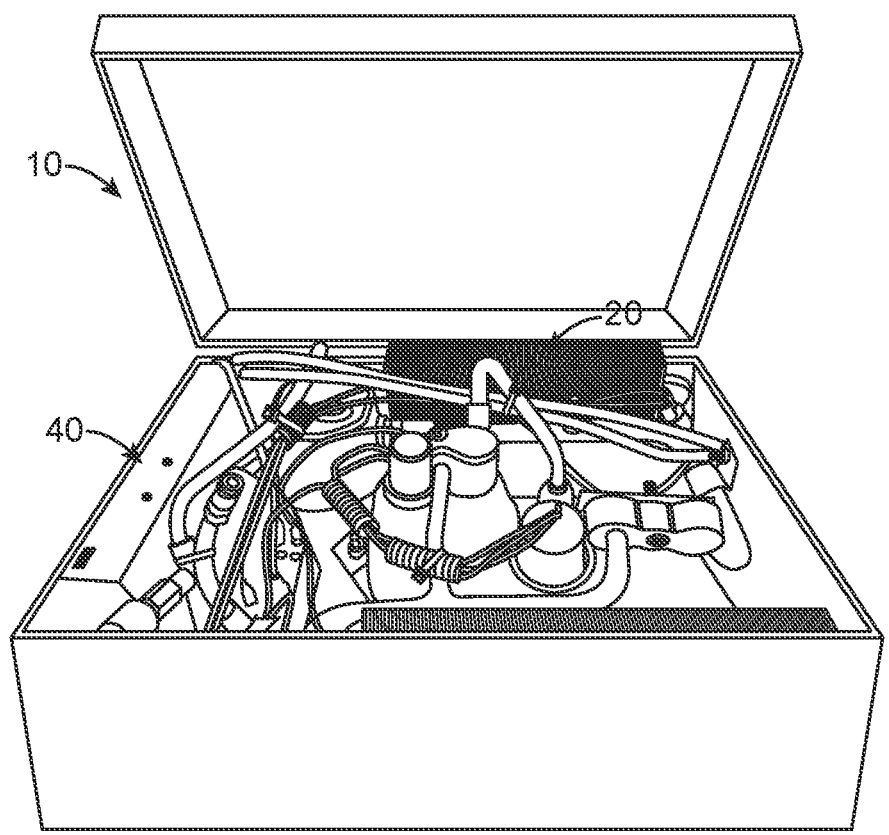
FIG. 2 shows an isometric view of A/C attachment system 10 having a compressor assembly 20 and a battery assembly 40 in accordance to an embodiment of the present invention.
Figure 3:
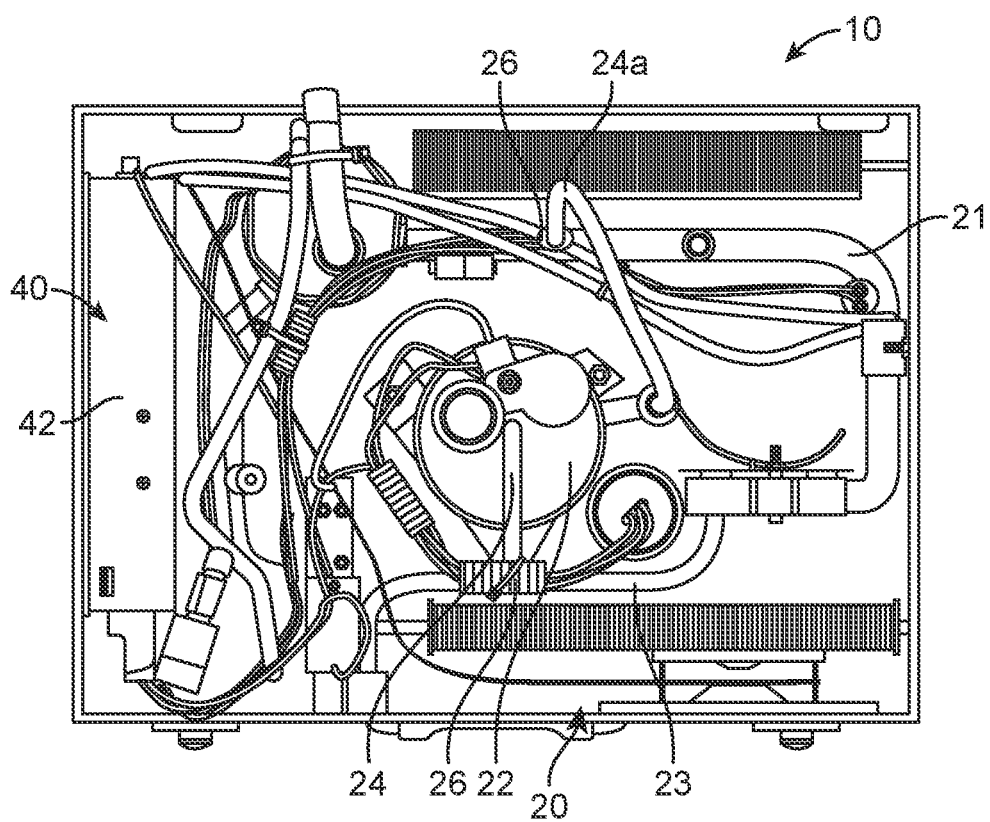
FIG. 3 illustrates a top view of A/C attachment system 10 having a compressor assembly 20 and a battery assembly 40 in accordance to an embodiment of the present invention.
Figure 4:
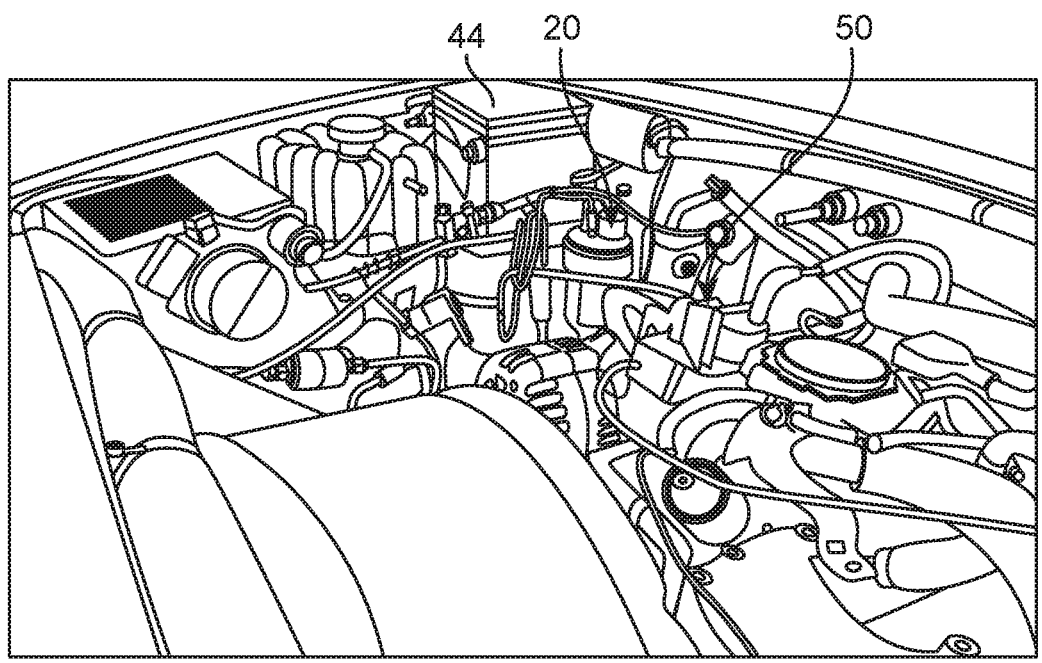
FIG. 4 is a representation of A/C attachment system 10 being mounted on a vehicle 50 in accordance to an embodiment of the present invention.

Referring now to the drawings, where the present invention is generally referred to with numeral 10, it can be observed an A/C attachment system 10 that basically includes a compressor assembly 20 and a battery assembly 40.

Compressor assembly 20 includes a compressor 22 having a first tube 24 and a second tube 24a attached thereon. Compressor 22 may be a hermetically sealed compressor such as a rotor or a scroll type compressor. However, it should be understood that any compressor having a suitable motor that can be battery powered may be used for compressor 22. It should also be understood the compressor 22 may be used as an additional attachment for an existing compressor 51 having a belt drive 52 in a vehicle. Compressor 22 may be mounted to a vehicle using known means in the art such as fasteners, welding, and the like. Additionally, compressor 22 may also serve as a replacement to the existing compressor in a vehicle. The first tube 24 may be cylindrical in shape and may be made of a stainless-steel material. It should be understood by one of ordinary skill in the art that the first tube 24 may be made of any suitable material to withstand high-pressure and low-pressure gas flowing therein. The second tube 24a may be cylindrical in shape and may be made of a stainless-steel material. It should be understood by one of ordinary skill in the art that the second tube 24a may be made of any suitable material to withstand high-pressure and low-pressure gas flowing therein. In the present embodiment, the first tube 24 and the second tube 24a are included in compressor assembly 20. The first tube 24 is attached to an existing suction line 21 which is connected to an existing accumulator U of an existing A/C system in a vehicle. The second tube 24a is attached to an existing vapor line 23 of an existing A/C system in a vehicle. The first tube 24 is attached to the existing suction line 21 using a tee connector of the tee connectors 26. The second tube 26 is attached to the existing vapor line using an additional tee connector of the tee connectors 26. Tee connectors 26 as known in the art may be of a stainless-steel material and comprises a "T" shape. Additionally, check valves 28 may be mounted to compressor assembly 20 to allow the refrigerant inside of the first tube 24 and the second tube 24a to flow in one direction. In the present embodiment, one of the check valves 28 is disposed on existing vapor line 23. Additionally, another one of the check valves 28 is disposed on the second tube 24a which is connected to existing vapor line 23. Check valves 28 as known in the art may be made of a metal material to withstand high pressure and low pressure. In an additional embodiment, a liquid receiver filter drier 53 may be added as an attachment to A/C attachment system 10. The liquid receiver filter drier 53 is mounted to an existing line 54 that connects an existing condenser coil 55 to an existing evaporator coil 56. Additionally, an orifice 57 may be added between the liquid receiver filter drier 53 and the existing evaporator coil 56. Existing evaporator coil 56 includes a blower 58 attached thereon and existing condenser coil 55 includes a fan 59 attached thereon.

Battery assembly 40 further includes an inverter 42. In one embodiment, inverter 42 may be attached to an existing battery 44 inside of a vehicle. In another embodiment, inverter 42 may be attached to an additional battery attachment to be added to a vehicle. It should be understood that inverter 42 is of a type that provides the necessary voltage to power compressor 22. These may include being attached to battery types such as wet cell car batteries, VRLA car batteries, and the like. Inverter 42 is used to provide the necessary voltage to compressor 22. This configuration allows a user to engage the A/C system in a vehicle without needing the engine within the vehicle to be running. In one embodiment, a user may engage A/C attachment system 10 using a switch located inside of the vehicle. In another embodiment, the existing A/C system in a car is replace using A/C attachment system 10. In this embodiment that A/C system of a car no longer relies on the engine of the vehicle. In another embodiment, a user may switch between using the existing A/C system in a car and A/C attachment system 10. In this embodiment, a user may utilize A/C attachment system 10 when the engine is turned off to cool the inside of a car. Afterwards, when a user desires to engage the engine of a vehicle, a user may then switch to using the existing A/C system of a vehicle. Such a configuration allows a user to save on the gas used for the vehicle.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An A/C attachment system, comprising:
   a. a compressor assembly, including a compressor having a first tube and a second tube attached thereon, wherein said compressor is a hermetically sealed compressor, said compressor is a scroll type compressor, said compressor is an additional attachment for an existing compressor of a vehicle, said compressor uses fasteners and welding to be mounted to said vehicle, wherein said first tube and said second tube are connected to an existing A/C system of said vehicle using tee connectors, wherein said first tube and said second tube include check valves, said check valves allows refrigerant within said first tube and said second tube to flow in one direction, the second tube operatively connects the compressor with a condenser coil of said existing A/C system, the compressor is operatively connected between an accumulator and said condenser coil, one of said check valves is operatively connected between said condenser and said condenser coil; and
   b. a battery assembly, including an inverter wherein said inverter provides a suitable voltage to said compressor, wherein said inverter is communicably attached to an existing battery within said vehicle.

2. The A/C attachment system of claim 1 wherein said first tube of said compressor is attached to an existing suction line, said existing suction line is connected to an accumulator of said existing A/C system of said vehicle.

3. The A/C attachment system of claim 1 wherein said second tube of said compressor is further attached to an existing vapor line of said existing A/C system of a vehicle, said existing vapor line is connected to said existing compressor of said existing A/C system of said vehicle.

4. The A/C attachment system of claim 1 wherein said compressor is a hermetically sealed compressor being a rotor type compressor.

5. The A/C attachment system of claim 1 wherein one of said check valves is mounted onto said existing vapor line of said existing A/C system of said vehicle, an additional check valve of said check valves is mounted onto said second tube.

6. The A/C attachment system of claim 1 wherein one of said tee connectors is used to mount said first tube and said existing suction line to an accumulator of said existing A/C system in said vehicle.

7. The A/C attachment system of claim 1 wherein one of said tee connectors is used to mount said second tube of said compressor and said existing vapor line to said condenser coil of said existing A/C system in said vehicle.

8. An A/C attachment system, comprising:
   a. a compressor assembly, including a compressor having a first tube and a second tube attached thereon, wherein said compressor is a hermetically sealed compressor, said compressor being a scroll type compressor, said compressor is an additional attachment for an existing compressor of a vehicle, said compressor uses fasteners and welding to be mounted to said vehicle, wherein said first tube and second tube are connected to an existing A/C system of a vehicle using tee connectors, wherein said first tube is attached to an existing suction line of said existing A/C system of a vehicle using one of said tee connectors, wherein said second tube is attached to said existing vapor line of said A/C system of a vehicle using one of said tee connectors, wherein said first tube and said second tube include check valves, wherein said check valves allow refrigerant within said first tube and said second tube to flow in one direction; and
   b. a battery assembly, including an inverter wherein said inverter provides the necessary voltage to power said compressor, wherein said inverter is attached to an existing battery of said vehicle.

9. An A/C attachment system, consisting of:
   a. a compressor assembly, including a compressor having a first tube and a second tube attached thereon, wherein said compressor is a hermetically sealed compressor, said compressor being a scroll type compressor, said compressor is an additional attachment for an existing compressor of a vehicle, said compressor uses fasteners and welding to be mounted to said vehicle, wherein said first tube and second tube are connected to an existing A/C system of a vehicle using tee connectors, wherein said first tube is attached to an existing suction line of said existing A/C system of a vehicle using one of said tee connectors, said existing suction line is connected to an accumulator of said existing A/C system of said vehicle, wherein said second tube is attached to said existing vapor line of said A/C system of said vehicle using an additional tee connector of said tee connectors, said existing vapor line is connected to said existing compressor of said existing A/C system of said vehicle, wherein said first tube and said second tube include check valves, wherein said check valves allow refrigerant within said first tube and said second tube to flow in one direction, one of said check valves is mounted onto said existing vapor line of said existing A/C system of said vehicle, an additional check valve of said check valves is mounted onto said second tube, the second tube operatively connects the compressor with a condenser coil of said existing A/C system, the compressor is operatively connected between an accumulator and said condenser coil, one of said check valves is operatively connected between said condenser and said condenser coil; and b. a battery assembly, including an inverter wherein said inverter provides the necessary voltage to power said compressor, wherein said inverter is attached to an existing battery of said vehicle.

10. The A/C attachment system of claim 9 wherein in an alternative embodiment said compressor is a hermetically sealed compressor being a rotor type compressor.

11. The A/C attachment system of claim 1 further including an orifice between a preexisting liquid receiver filter drier and an existing evaporated coil.

\* \* \* \* \*